Oct. 26, 1965    P. VASKE    3,214,619
SHADED POLE MOTOR WITH SATURATED POLE TIPS
Filed Aug. 1, 1960

Inventor:
Paul Vaske
by George H Spencer
Attorney

United States Patent Office 3,214,619
Patented Oct. 26, 1965

3,214,619
SHADED POLE MOTOR WITH SATURATED
POLE TIPS
Paul Vaske, Hamburg, Germany, assignor to Licentia
Patent - Verwaltungs - G.m.b.H., Frankfurt am Main,
Germany
Filed Aug. 1, 1960, Ser. No. 46,570
Claims priority, application Germany, Aug. 7, 1959,
L 33,910
5 Claims. (Cl. 310—172)

The present invention relates to a shaded-pole motor having salient or projecting pole tips and a uniform air gap.

The instant invention more particularly relates to a shaded-pole motor which does not utilize any magnetic bridges.

In shaded-pole motors of 50 or more watt capacity an increase in load produces an undesirable distortion in the torque characteristic of the motor. This distortion is due to the third harmonic of the magnetic field which revolves in a direction opposite to the main field and thus produces an opposite torque. The third harmonic is particularly effective in shaded-pole motors having projecting pole tips and uniform air gaps. Accordingly, it is possible for this reverse torque to bring the motor to a standstill at an intermediate load point and to cause the motor to turn at about one-third of its normal rotational speed at full load.

It is, therefore, an object of the present invention to provide a shaded-pole motor which does not have the operational deficiencies of the conventional motors.

It is another object of the present invention to provide a shaded-pole motor having a torque characteristic which avoids the effect of the higher harmonics present in such motors.

It is a still further object of the present invention to provide a shaded-pole motor having saturated pole tips so as to eliminate the effect of higher harmonics.

With the above objects in view, the present invention resides mainly in a shaded-pole motor including a stator which has salient poles each provided with shade pole portions, these poles forming uniform gaps between themselves and the armature of the motor, each of which poles has two tips that are free of slots, and a major portion of each tip of each pole is magnetically saturated at least substantially uniformly when the motor is operating under normal load.

Additional objects and advantages of the present invention will become apparent upon consideration of the following description when taken in conjunction with the accompanying drawings in which.

Figure 1:
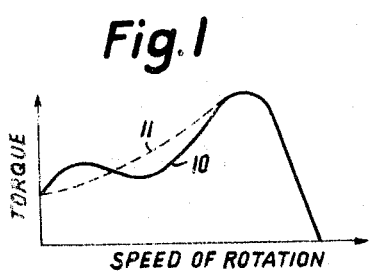
FIGURE 1 is a graphical representation of a torque characteristic of a shaded-pole motor.

Referring now to the drawings and more particularly to FIGURE 1, it will be seen that FIGURE 1 is a plot of the torque versus speed of rotation of a shaded-pole motor. The solid line 10 is the torque characteristic of a conventional shaded-pole motor of about 80 watts, whereas the dashed line 11 is the desired torque characteristic for a shaded-pole motor.

In order to avoid the humpback distortion of the characteristic at lower speeds, it is necessary to reduce sharply the harmonic field which causes this distortion. This can be accomplished in small motors having a capacity of less than 50 watts by using non-uniform air gaps. This arrangement has several disadvantages since the machine tools which are used to produce the stator lamination can no longer machine these laminations in circular form. The additional amount of machine time thus required for making the non-uniform air gaps adds substantially to the manufacturing costs of these motors. In view of the fact that these are low capacity motors and supposedly inexpensive, the added machining cost increases the cost of the motor out of proportion.

Figure 2:
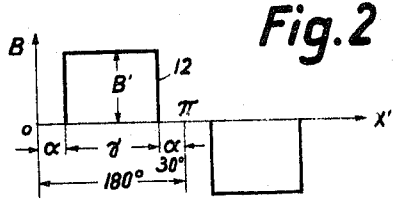
FIGURE 2 is a graphical representation of a wave form of the field distribution in a conventional shaded-pole motor.

In order to eliminate this distortion of the torque characteristic, some characteristics of shaded-pole motors should now be considered in the light of the theory of the Fourier series. With a uniform air gap, a rectangular field distribution is produced in the air gap of the shaded-pole motor. By proper choice of the distance between the poles, the rectangular curve can be extended over an entire period or a portion thereof. In FIGURE 2, such a rectangular field distribution is indicated by the line 12.

The field distribution along the pole face is represented by the ordinate of the graphical representation of FIGURE 2, and it will be seen that this field distribution or induction B is uniform. Between the poles are spaces having a width $2\alpha$. The Fourier series for this field curve distribution is represented by the following equation:

$$b_x = \frac{4}{\pi} B \left[ \frac{\cos \alpha}{1} \sin x' + \frac{\cos 3\alpha}{3} \sin 3x' + \cdots + \frac{\cos n\alpha}{n} \sin nx' \right]$$

wherein $n$ is an uneven number.

The third harmonic disappears when $\alpha$ equals 30 degrees, i.e., when the pole of the motor covers only 120 degrees of the magnetic field distribution.

This rectangular shape of the field exists theoretically for the main pole. For the shaded pole, however, it is no longer possible to have such a rectangular field distribution and, in fact, in most cases it is not necessary since the main portion of the third harmonic field is due to the main field. In large shaded-pole motors in the order of 50 to 200 watt capacity, it is not feasible to construct a main pole which extends only 120 degrees because the stray fields between the poles would then be very small. A large stray field between the poles is desired since it is by this method that the field of the shaded pole can be properly oriented with respect to the main field.

Figure 3:
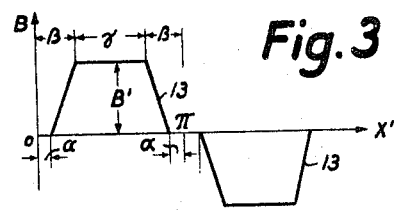
FIGURE 3 is a graphical representation of the desired wave form of the field distribution characteristic of a shaded-pole motor.

A more desirable arrangement is produced if the field distribution is trapezoidal in form. Such a trapezoidal field is shown in FIGURE 3. The Fourier series for such a trapezoidal curve is indicated by the following equation:

$$b_x = \frac{4}{\pi} \cdot \frac{B}{(\beta-\alpha)} \left[ \frac{\sin\beta - \sin\alpha}{1} \sin x' + \frac{\sin 3\beta - \sin 3\alpha}{3^2} \sin 3x' + \ldots + \frac{\sin n\beta - \sin n\alpha}{n^2} \sin nx' \right]$$

The third harmonic disappears when $$\beta + \alpha = 60°$$

or since $$\gamma + 2\beta = 180°$$

then for the case where $$\gamma = 60° + 2\alpha$$

The following table shows that with such a trapezoidal field distribution, the main field may be easily reduced.

TABLE 1

*Ratio of the amplitudes of B1–3/B of the harmonics*

| Ratio | $\alpha=30°$ $\beta=30°$ | $\alpha=10°$ $\beta=50°$ | $\alpha=0°$ $\beta=60°$ |
|---|---|---|---|
| B1/B | 1.1 | 1.08 | 1.05 |
| B3/B | 0 | 0 | 0 |
| B5/B | −0.22 | −0.124 | −0.042 |

In addition to the above, the higher harmonics are also reduced for the trapezoidal field as compared to the rectangular field. For this as well as the previously mentioned reasons, it is clear that a trapezoidal field distribution has many advantages.

In FIGURE 3, the trapezoidal field distribution at the poles is indicated by the line 13. Such a trapezoidal field distribution can be produced if a member having a non-uniform magnetic reluctance is arranged at the ascending and descending portions of the trapezoidal curve. This non-uniform magnetic reluctance can be produced by the utilization of a non-uniform air gap, as has been done in conventional motors. However, as has been pointed out hereinabove, this has substantial disadvantages due to the high cost of producing a non-uniform air gap.

In accordance with the present invention, a non-uniform path for the magnetic field is produced by saturating a portion of the pole of the motor out toward the tip of the pole. Such an arrangement is well suited for the manufacturing techniques utilized for manufacturing large shaded-pole motors since it is only with great difficulty and expense that the various laminations making up the stator of the shaded-pole motor can be uniformly mounted and uniformly finished to have precisely the same magnetic characteristics.

This arrangement has a further advantage in the manufacture of large shaded-pole motors using pieces of metal for shaping the stray fields since these same metallic pieces can be shaped to serve as the extended pole tips of the pole.

The saturation of the pole face should begin about 60 electrical degrees from the center of the main pole for motors using stray field shaping members. For those motors not using such stray field shaping members, this arrangement provides an unsaturated portion of the pole which is approximately 60 electrical degrees plus double the width of the main pole groove. The surface of the unsaturated portion of the pole face is designated as the starting cross section of the pole face. The construction of the stator must be so arranged as to produce a magnetic flux density in the stator which is such that the starting cross section of the pole face at the projecting pole portion is always smaller than half of the cross section of the stator yoke.

With the above arrangement, it is thus possible to produce large shaded-pole motors having 50 or more watt capacity with little distortion of the torque characteristic, while simultaneously providing circular inner contours of the stator laminations.

Figure 4:
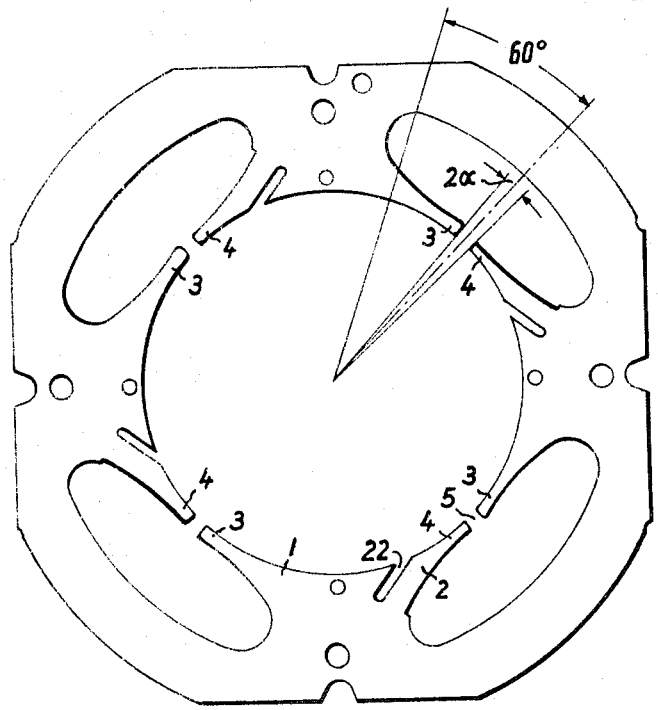
FIGURE 4 is a plan view of a stator lamination for a four-pole shaded-pole motor incorporating the principles of the present invention.

Referring now to FIGURE 4, one such example of a stator lamination incorporating the principles of the present invention is shown for a four-pole shaded-pole motor. The shaded pole portion 2 is illustrated as being spaced from the main portion of pole 1. The pole tips of each of the poles 1 are designated by the numeral 3, and the pole tips of each of the shaded pole portions 2 are designated by the numeral 4.

The pole tip 3 of the pole and the pole tip 4 of the shaded pole portion form between themselves a groove 5. It will be seen that the groove or channel 5 is arranged between the main and the shaded poles. The width of the groove 5 corresponds to the angle $2\alpha$. The saturation zone of the pole tips corresponds to an angle of approximately 60 electrical degrees starting from the center of the groove 5 and ranging outwards. The 60 degree saturation zone is shown in the upper right-hand corner of FIGURE 4.

Figure 5:
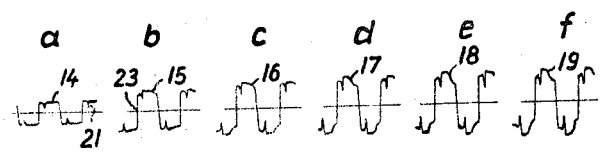
FIGURE 5 shows oscillographic presentations of the field distribution of shaded-pole motors with increasing exciting current.

FIGURE 5 shows oscillograph readings taken of the field pattern of a motor such as illustrated in FIGURE 4 while the exciting current of the motor is being increased. In FIGURE 5, *a* shows a practically rectangular field pattern, line 14, with very low exciting current. The pole tips are not yet saturated due to the low level of magnetic flux produced at this time. The pips 21 in the horizontal portions of the curve 14 correspond to the space 22 between the shaded pole and the main pole.

In the representations *b*, *c*, *d*, *e* and *f*, the exciting current of the motor is continuously increasing. In curve 15 of *b*, the effect of the saturation of the pole tips begins to be appparent since the ordinate values in the neighborhood of the phase reversal points 23 are no longer increasing, the tips of the poles at this point being already saturated. This effect progresses on both sides of the point 23 as the field current increases with the curves 16, 17 and 18 so that at normal excitation of the motor, in accordance with *f*, the curve 19 approximates a sinusoidal wave form. The distortion of the torque characteristic of the shaded pole-motor is thus avoided.

With the construction indicated in FIGURE 4 and set forth in the remainder of the application, it is possible to build a large capacity shaded-pole motors having distortion-free operating characteristics so as to avoid any reverse torque effects on the armature of the motor due to the harmonic fields. The motor will then run more quietly and more efficiently since it need not overcome the usual internal stresses found in motors of this type.

It will be understood that the above description of the present invention is susceptible to various modifications, changes and adaptations, and the same are intended to be comprehended within the meaning and range of equivalents of the appended claims.

I claim:

1. In a shaded-pole motor, a stator having salient poles, each provided with shaded pole portions and each pole having two tips that are free of slots, said poles forming uniform gaps between themselves and the armature of the motor, a major portion of each tip of each pole being a zone which is magnetically at least substantially uniformly saturated when the motor is operating under normal load.

2. A stator as defined in claim 1 wherein, when said motor is operating under full load, the remaining unsaturated portions of said poles extend for a distance of substantially 60 electrical degrees plus twice the width of the air gap between consecutive pole tips.

3. A stator as defined in claim 1, said stator being in yoke form, the cross-sectional area of the tips of said poles being smaller than one-half the cross-sectional area of the yoke.

4. A shaded-pole motor as defined in claim 1, wherein the distance between said main poles, including said shaded poles thereof, and the armature of said motor is such as to produce a trapezoidal field distribution pattern when said motor is operating under load.

5. A motor as defined in claim 4 wherein said trapezoidal field distribution pattern is obtained by magnetically saturating said shaded pole portions when said motor is operating under load.

References Cited by the Examiner

UNITED STATES PATENTS

| | | | |
|---|---|---|---|
| 1,823,979 | 9/31 | Jordan | 310—172 |
| 2,610,993 | 9/52 | Stark | 310—190 |
| 2,715,690 | 8/55 | Neuenschwander | 310—254 |
| 2,815,460 | 12/57 | Jones et al. | 310—172 |
| 2,827,583 | 3/58 | Hoddy | 310—172 |
| 2,864,987 | 12/58 | Vaske | 318—223 |
| 2,886,722 | 5/59 | Moehlenpah | 310—172 |
| 2,977,490 | 3/61 | Sherer | 310—172 |

FOREIGN PATENTS 1,064,568  10/52  France.

MILTON O. HIRSHFIELD, *Primary Examiner.*